Jan. 17, 1967  W. E. RISE  3,298,241
TILT STEERING WHEEL
Filed Jan. 21, 1965  2 Sheets-Sheet 1

INVENTOR.
William E. Rise
BY
Edward J. Biskup
ATTORNEY

INVENTOR.
William E. Rise
BY
Edward J. Biskup
ATTORNEY

United States Patent Office 3,298,241
Patented Jan. 17, 1967

3,298,241
TILT STEERING WHEEL
William E. Rise, Grosse Pointe, Mich., assignor to General Motors Corporation, Detroit, Mich., a corporation of Delaware
Filed Jan. 21, 1965, Ser. No. 426,746
9 Claims. (Cl. 74—493)

This invention concerns a steering mechanism and more particularly a steering column assembly which employs a cam-operated adjusting mechanism for tilting the steering wheel.

Tilt steering wheels can be found incorporated with many vehicles at the present time and one example of a mechanism utilized for positioning the steering wheel can be seen in copending patent application entitled, "Adjustable Steering Column," S.N. 221,833, filed September 6, 1962, now Patent No. 3,167,971, and assigned to the assignee of this invention. The adjusting mechanism shown in this patent application includes a latch device which, in response to manual actuation, permits the steering wheel to be tilted relative to the driver to a plurality of predetermined positions about a horizontal axis extending transversely of the vehicle. This form of steering wheel tilt mechanism has found general acceptance by the automobile industry; however, one difficulty with the particular construction described above is that it is relatively expensive to manufacture and assemble because it employs a relatively large number of operating parts and components. Another drawback of this type of tilt mechanism is that the driver is limited to six steering wheel positions provided by the latch device and, therefore, at times cannot tilt the steering wheel to the exact driving position desired.

Accordingly, a principal object of this invention is to provide an adjusting mechanism for a steering column assembly that permits the steering wheel to be moved to an infinite number of positions between controlled upper and lower positions.

Another object of this invention is to provide an adjusting mechanism for a steering column assembly that employs camming means for tilting the steering wheel and includes positive locking means for holding the steering wheel in the adjusted position.

A further object of this invention is to provide a tiltable steering wheel having an adjusting mechanism that serves to move the steering wheel in an upward or downward direction in response to rotation of an actuator mounted on the fixed lower steering column.

A still further object of this invention is to provide a tiltable steering wheel having an adjusting mechanism that employs a minimum of parts which are inexpensive to manufacture and assemble.

The above and other objects are obtained by an adjustable steering assembly which comprises a fixed lower column section and an upper column section. Each of the column sections rotatably supports a steering shaft, the inner ends of which are interconnected by a universal coupling. The column sections are interconnected by a pivotal connection, the axis of which extends through the center of the coupling so as to provide angular movement of the steering wheel about a horizontal axis between upper and lower extreme positions. The lower column section is provided with a rotatable driver cam which engages a driven cam rigidly formed with the upper column section. The engaging camming surfaces are so formed and so located that upon rotation of the driver cam the upper column section together with the steering wheel is movable to an infinite number of positions about the aforementioned horizontal axis.

Other objects and advantages of the subject invention will be more apparent from the following detailed description when taken in conjunction with the drawings in which.

Figure 1:
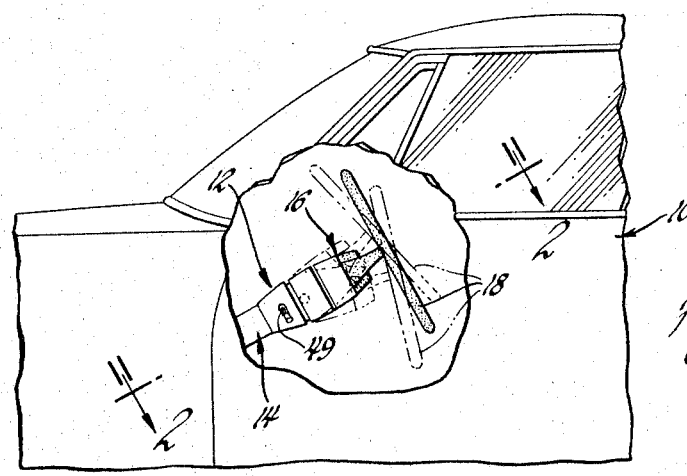
FIGURE 1 is a fragmentary side elevational view of a portion of a vehicle with parts being broken away to show the general location and range of movement of a steering column assembly made in accordance with this invention.

Referring to the drawings and more particularly to FIGURE 1, a conventional motor vehicle 10 is shown in which a steering column assembly 12 is appropriately located. The steering column assembly comprises a fixed lower column section 14 and a tiltable upper column section 16 which includes a steering wheel 18. As shown in dotted lines, the upper column section and steering wheel are adapted for tilting movement about a horizontal transverse axis, both upwardly and downwardly from the conventional position wherein the steering wheel plane is normal to the axis of the lower column section.

Figure 2:
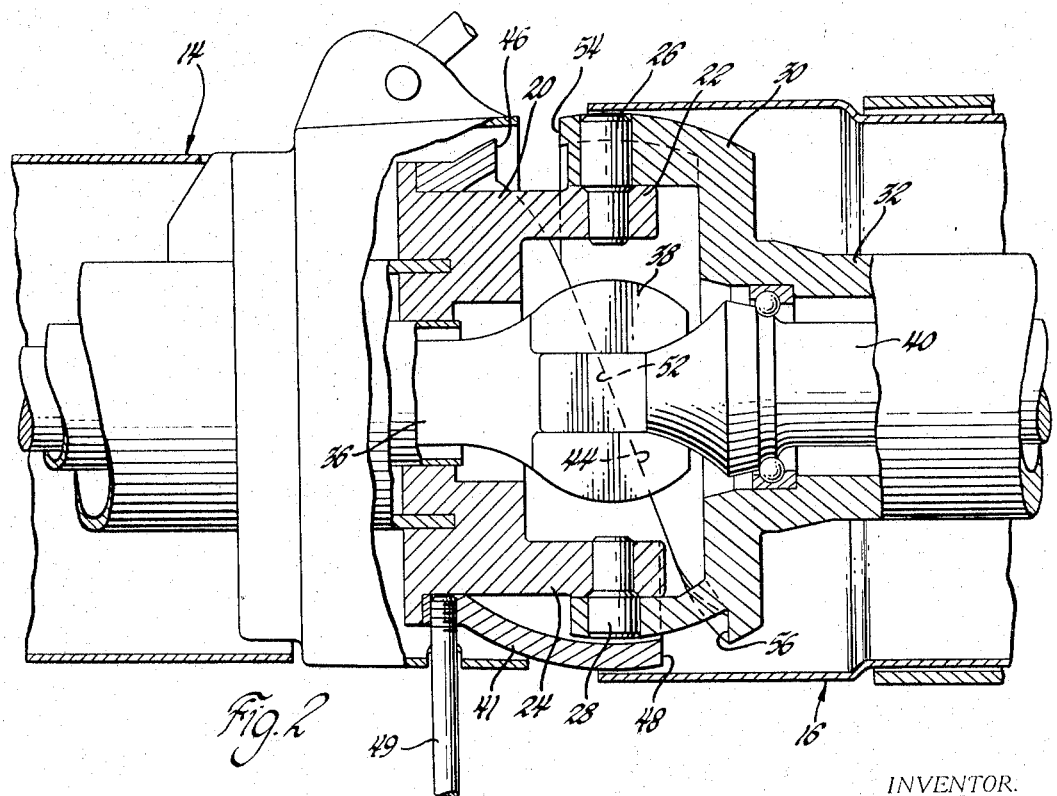
FIGURE 2 is a view taken on line 2—2 of FIGURE 1.
Figure 3:
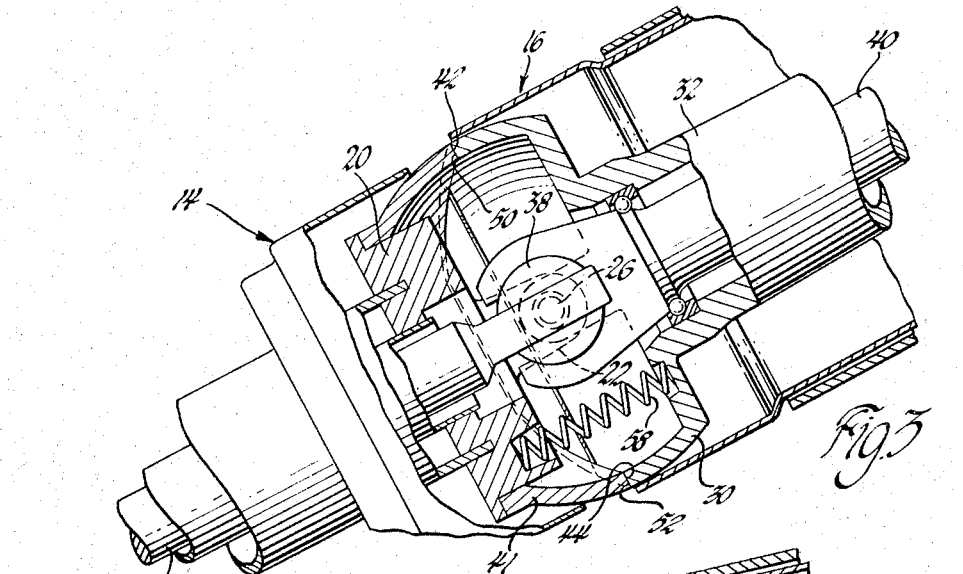
FIGURE 3 is a side elevational view showing details of the construction of the adjusting mechanism made in accordance with the invention.

As best seen in FIGURES 2 and 3, the upper end of the lower column section 14 has a support housing 20 fixed thereto which includes a pair of upwardly extending ears 22 and 24 that respectively accommodate the inner ends of axially aligned pivot pins 26 and 28. The outer ends of the pivot pins are received within a downwardly projecting skirt portion or driven cam 30 which is formed integrally with a bearing support 32 located in the upper column section 16. The common axis of the pivot pins 26 and 28 extends transversely of the vehicle in a horizontal plane and, as should be apparent, provides the pivot axis about which the upper column section moves relative to the lower column section.

A conventional steering shaft 36 is rotatably supported within the lower column section 14 and has the upper end thereof connected by a universal coupling 38 to a stub shaft 40 rotatably journaled in the support 32 and connected to the steering wheel 18. Thus, rotational movement of the steering wheel is transmitted through the universal coupling 38 to the steering shaft 36 irrespective of the position of the upper column section with respect to the lower column section. As should be apparent in order to realize such movement, the common axis passing through the pivot pins 26 and 28 also passes through the center of the universal coupling.

Figure 5:
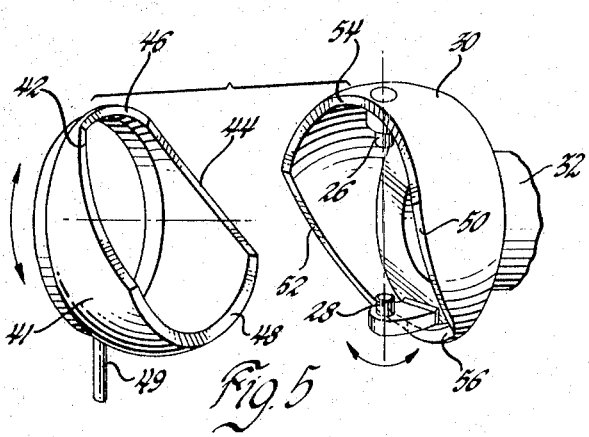
FIGURE 5 is a perspective view showing in detail the construction of the driver cam and the driven cam employed with the adjusting mechanism of FIGURES 1 through 4.

As best seen in FIGURES 2 and 5, a driver cam 41 is rotatably mounted on the support housing 20. The driver cam 41 is spherical in outer form and includes camming surfaces 42 and 44 which lie in an inclined plane that passes through the center of the universal coupling and form equal angles with a plane that is perpendicular to the longitudinal axis of the lower column section and passes through the axis of the pivot pins. The upper ends of the surfaces 42 and 44 connect with an offset surface 46 while the lower ends are joined by a similarly offset surface 48. The surfaces 46 and 48 are located in spaced parallel planes which are perpendicular to the longitudinal axis of the aligned steering assembly as seen in FIGURE 2. In addition, a lever or rod 49 radially extends from the driver cam and provides a means for the driver to rotate the driver cam about the housing 20. It will be noted that the inner end of the rod is threadably received by a through bore in the cam driver so that rotation of the rod about its longitudinal axis causes it to engage the support housing 20. In this manner, the driving cam can be locked in position relative to the lower column section.

Figure 4:
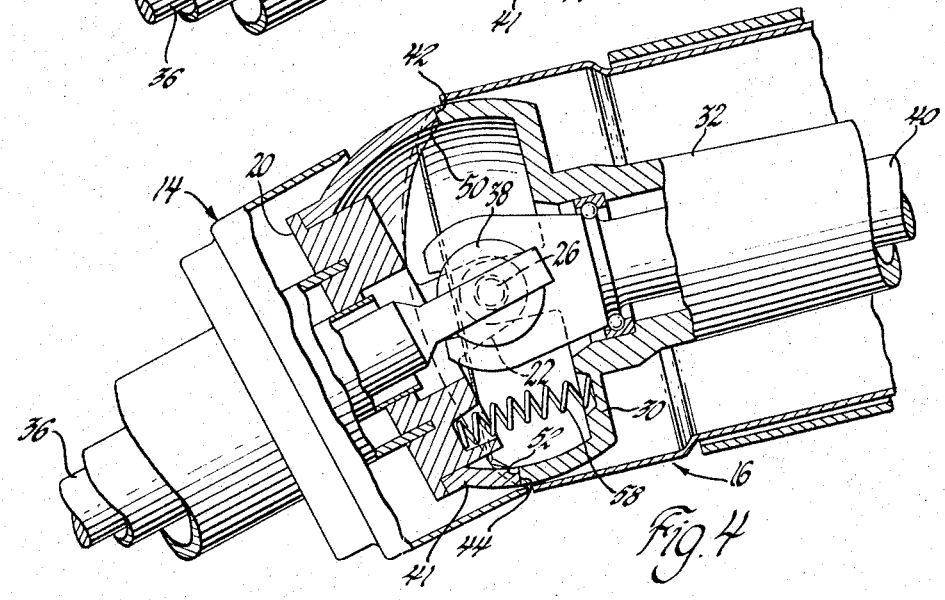
FIGURE 4 is a view similar to FIGURE 3 with parts located so as to show the upper column section tilted relative to the fixed lower column section.

The driven cam 30 is also spherical in form and includes camming surfaces 50 and 52 that respectively complement the surfaces 42 and 44 formed on the driver cam. The offset surfaces 54 and 56 formed on the driven cam are similar to surfaces 46 and 48 and are also located in spaced parallel planes. As seen in FIGURES 3 and 4, a coil spring 58 is located between the driven cam and the support housing 20 and is continuously in compression. The purpose of the spring 58 will be more fully understood from the description of the operation of the invention which now follows.

As should be apparent from the above, rotation of the driver cam 49 about the longitudinal axis of the lower column section 14 causes the surfaces 50 and 52 to move along the surfaces 42 and 44 resulting in the driven cam 30 and, accordingly, the upper column section 16 being tilted about the horizontal axis passing through the pivot pins 26 and 28.

More specifically and with reference to FIGURE 1, when the driver cam 49 is rotated clockwise as viewed by the vehicle operator, the cam surface 50 is lowered while the cam surface 52 rises so as to cause the upper column section 16 to pivot upwardly about the pivot pins 26 and 28. Counterclockwise rotation of the driver cam, of course, reverses the direction of movement of the cam surfaces 50 and 52 so that the upper column section is driven downwardly. When the steering wheel is located in the desired position, the rod 58 is manually rotated about its axis as aforedescribed to lock the cam driver to the support housing 20 so that the upper column section is fixed in the adjusted position.

The degree of tilt of the upper column section relative to the lower column section, of course, will depend upon the angle of inclination of the surfaces 42, 44, 50 and 52. In this case, an angle of approximately 20° was chosen so that rotation of the driver cam results in approximately 30° of tilt from one extreme position to the other.

It will also be noted that in the preferred form, both the driver and driven cam member's spherical surfaces have a common center which is the center of the universal coupling 38. Moreover, although the camming surfaces are illustrated as being planar, they can take other shapes so long as they are developed so that any radial line on their surface will pass through the center of the universal coupling.

Inasmuch as tilting movement of the upper column section 16 is realized through a camming arrangement as described above and due to the inclined arrangement of the steering assembly, it should be apparent that the weight of the steering wheel together with the other components which constitute the upper column section will have a direct effect on the amount of force required to rotate the driver cam 41 for raising or lowering the steering wheel. For example, when the upper and lower column sections are axially aligned, as shown in FIGURE 3, and the driver cam is rotated counterclockwise so as to lower the steering wheel to the position of FIGURE 4, the weight of the upper column section acts downwardly or in the direction of steering wheel tilt. Hence, the weight acts with the lowering cam surface 44 to reduce the amount of manual force required to rotate the driver cam. In contradistinction, when the driver cam is rotated in the opposite direction or clockwise so as to raise the steering wheel from the position of FIGURE 4 to the position of FIGURE 3 or higher, the cam surface 44 raises and is opposed by the weight of the upper column section. Accordingly, a greater amount of force would be required to rotate the driver cam. In order to compensate for this difference of driver cam rotational force required for upward and downward movement of the steering wheel, the spring 58 is provided between the driven cam and the support housing. The spring serves to continuously urge the members apart and is sufficiently strong to offset the weight of the upper column section so that the force required to rotate the driver cam is the same whether the steering wheel is being raised or lowered.

Various changes and modifications can be made in this construction without departing from the spirit of the invention. Such changes and modifications are contemplated by the inventor and he does not wish to be limited except by the scope of the appended claims.

I claim:

1. An adjustable steering assembly comprising a fixed lower column section and an upper column section, an upper steering shaft journaled in the upper column section, a lower steering shaft supported in the lower column section, means connecting said upper and lower shafts and permitting movement of the upper column section relative to the lower column section between two extreme positions, a cam rotatably supported on one of said column sections, a cam follower fixed to the other of said column sections, said cam engaging said cam follower whereby rotation of said cam causes said upper column to move to positions between said two extreme positions.

2. An adjustable steering assembly comprising a fixed lower column section and an upper column section, an upper steering shaft journaled in the upper column section, a lower steering shaft supported in the lower column section, means connecting said upper and lower shafts and permitting movement of the upper column section relative to the lower column section between two extreme positions, a cam rotatably supported on one of said column sections, means operatively connected to said cam for locking the latter to the associated column section, a cam follower fixed to the other of said column sections, said cam engaging said cam follower whereby rotation of said cam causes said upper column to move to positions between said two extreme positions.

3. An adjustable steering assembly comprising a fixed lower column section and an upper column section, an upper steering shaft journaled in the upper column section, a lower steering shaft supported in the lower column section, means pivotally connecting said upper and lower shafts and permitting movement of the upper column section relative to the lower column section about a horizontal axis between two extreme positions, a cam supported on one of said column sections for rotation about the longitudinal axis of the latter, a cam follower fixed to the other of said column sections, said cam engaging said cam follower whereby rotation of said cam causes said upper column to move to positions between said two extreme positions.

4. An adjustable steering assembly comprising a fixed lower column section and an upper column section, an upper steering shaft journaled in the upper column section, a lower steering shaft supported in the lower column section, means pivotally connecting said upper and lower shafts and permitting movement of the upper column section relative to the lower column section about a horizontal axis between two extreme positions, a cam rotatably supported on one of said column sections for rotation about the longitudinal axis of the latter, manually operable means connected to said cam for locking the latter to the associated column section, a cam follower fixed to the other of said column sections, and said cam engaging said cam follower whereby rotation of said cam causes said upper column to move to positions between said two extreme positions.

5. An adjustable steering assembly comprising a fixed lower column section and an upper column section, an upper steering shaft rotatably mounted in the upper column section, a lower steering shaft rotatably supported in the lower column section, a universal coupling connecting said upper and lower shafts, a steering wheel fixed to the upper shaft, a first spherically-shaped member fixed with said upper column section, means pivotally connecting said first member with said lower column section so that said upper column section is movable relative to the lower column section about a horizontal axis passing through the center of said universal coupling, a second spherically-shaped member mounted on the lower column section for rotation about the longitudinal axis of said lower column section, said first and second members being formed with cooperating camming surfaces whereby rotation of said second member causes the upper column section to pivot about said horizontal axis.

6. An adjustable steering assembly comprising a fixed lower column section and an upper column section, an upper steering shaft rotatably mounted in the upper column section, a lower steering shaft rotatably supported in the lower column section, a universal coupling connecting said upper and lower shafts, a steering wheel fixed to the upper shaft, a first spherically-shaped member fixed with said upper column section, means pivotally connecting said first member with said lower column section so that said upper column section is movable relative to the lower column section about a horizontal axis passing through the center of said universal coupling, a second spherically-shaped member mounted on the lower column section for rotation about the longitudinal axis of said lower column section, said first and second members being formed with cooperating camming surfaces whereby rotation of said second member causes the upper column section to pivot about said horizontal axis, and a handle extending from said second member for manually rotating the latter for adjusting the position of said upper column section.

7. An adjustable steering assembly comprising a fixed lower column section and an upper column section, an upper steering shaft rotatably mounted in the upper column section, a lower steering shaft rotatably supported in the lower column section, a universal coupling connecting said upper and lower shafts, a steering wheel fixed to the upper shaft, a first spherically-shaped member fixed with said upper column section, means pivotally connecting said first member with said lower column section so that said upper column section is movable relative to the lower column section about a horizontal axis passing through the center of said universal coupling, a second spherically-shaped member mounted on the lower column section for rotation about the longitudinal axis of said lower column section, said first and second members being formed with complementary camming surfaces, said camming surfaces lying in a common transverse plane inclined to said longitudinal axis and to said horizontal axis whereby rotation of said second member causes the upper column section to pivot about said horizontal axis, and a handle extending from said second member for manually rotating the latter for adjusting the position of said upper column section.

8. An adjustable steering assembly comprising a fixed lower column section and an upper column section, an upper steering shaft rotatably mounted in the upper column section, a lower steering shaft rotatably supported in the lower column section, a universal coupling connecting said upper and lower shafts, a steering wheel fixed to the upper shaft, a first member fixed with said upper column section, means pivotally connecting said first member with said lower column section so that said upper column section is movable relative to the lower column section about a horizontal axis passing through the center of said universal coupling, a second member mounted on the lower column section for rotation about the longitudinal axis of said lower column section, said first and second members being spherically-shaped with the center thereof located at said center of the universal coupling and being formed with cooperating camming surfaces whereby rotation of said second member causes the upper column section to pivot about said horizontal axis, and a handle extending from said second member for manually rotating the latter for adjusting the position of said upper column section.

9. An adjustable steering assembly comprising a fixed lower column section and an upper column section, an upper steering shaft rotatably mounted in the upper column section, a lower steering shaft rotatably supported in the lower column section, a universal coupling connecting said upper and lower shafts, a steering wheel fixed to the upper shaft, a first spherically-shaped member fixed with said upper column section, means pivotally connecting said first member with said lower column section so that said upper column section is movable relative to the lower column section about a horizontal axis passing through the center of said universal coupling, a second spherically-shaped member mounted on the lower column section for rotation about the longitudinal axis of said lower column section, said first and second members being formed with cooperating camming surfaces whereby rotation of said second member causes the upper column section to pivot about said horizontal axis, a manually operable rod radially extending from said second member for rotating the latter for adjusting the position of said upper column section, said rod being supported by the second member for rotation about its longitudinal axis for locking said second member to the lower column section.

No references cited.

MILTON KAUFMAN, *Primary Examiner.*